(12) United States Patent  
Ichikawa

(10) Patent No.: US 9,960,638 B2
(45) Date of Patent: May 1, 2018

(54) WIRELESS POWER TRANSMISSION SYSTEM

(71) Applicant: Murata Manufacturing Co., Ltd., Nagaokakyo-shi, Kyoto-fu (JP)

(72) Inventor: Keiichi Ichikawa, Nagaokakyo (JP)

(73) Assignee: MURATA MANUFACTURING CO., LTD., Nagaokayo-Shi, Kyoto-Fu (JP)

(*) Notice: Subject to any disclaimer, the term of this patent is extended or adjusted under 35 U.S.C. 154(b) by 232 days.

(21) Appl. No.: 14/887,551

(22) Filed: Oct. 20, 2015

(65) Prior Publication Data

US 2016/0043575 A1 Feb. 11, 2016

Related U.S. Application Data

(63) Continuation of application No. PCT/JP2014/067325, filed on Jun. 30, 2014.

(30) Foreign Application Priority Data

Jul. 1, 2013 (JP) .................................. 2013-137683

(51) Int. Cl.
  *H02J 50/05* (2016.01)
  *H02J 7/02* (2016.01)
  (Continued)

(52) U.S. Cl.
  CPC ............ *H02J 50/05* (2016.02); *H02J 5/005* (2013.01); *H02J 7/025* (2013.01); *H02J 50/12* (2016.02); *H02J 50/40* (2016.02)

(58) Field of Classification Search
  CPC .. H02J 3/005; H02J 5/005; H02J 17/00; H02J 50/00; H02J 50/05
  (Continued)

(56) References Cited

U.S. PATENT DOCUMENTS 8,610,312 B2* 12/2013 Kikuchi ................. H01Q 1/248
  307/104
8,907,526 B2* 12/2014 Harakawa ............... H02J 5/005
  307/104

(Continued)

FOREIGN PATENT DOCUMENTS

JP H11-40206 A 2/1999
JP 2009/089520 A 4/2009

(Continued)

OTHER PUBLICATIONS

International Search Report issued for PCT/JP2014/067325, dated Aug. 12, 2014.

(Continued)

*Primary Examiner* — Dinh T Le
(74) *Attorney, Agent, or Firm* — Arent Fox LLP

(57) ABSTRACT

A wireless power transmission system includes a power transmission device, which applies an alternating-current voltage to active and passive electrodes, and a power reception device, which supplies to a load a voltage induced in active and passive electrodes facing the active and passive electrodes of the power transmission device. The power transmission device includes a planar coil connected to the active and passive electrodes and the power reception device includes a planar coil connected to the active and passive electrodes. Magnetic flux generated by the planar coils link with each other causing the planar coils to be magnetic-field coupled with each other. Thus, a wireless power transmission system capable of efficiently transmitting power is provided.

20 Claims, 13 Drawing Sheets

(51) Int. Cl.
*H02J 50/40* (2016.01)
*H02J 5/00* (2016.01)
*H02J 50/12* (2016.01)

(58) Field of Classification Search
USPC .......................................................... 307/104
See application file for complete search history.

(56) References Cited

U.S. PATENT DOCUMENTS

| | | | |
|---|---|---|---|
| 9,478,992 B2* | 10/2016 | Hosotani | ................. H02J 5/005 |
| 2003/0020332 A1 | 1/2003 | Giannopoulos et al. | |
| 2009/0302690 A1 | 12/2009 | Kubono et al. | |
| 2012/0262005 A1 | 10/2012 | Camurati et al. | |
| 2014/0015340 A1 | 1/2014 | Ito et al. | |
| 2014/0152122 A1 | 6/2014 | Ichikawa | |

FOREIGN PATENT DOCUMENTS

| | | |
|---|---|---|
| JP | 2009-531009 A | 8/2009 |
| JP | 2009-295857 A | 12/2009 |
| JP | 2012-135086 A | 7/2012 |
| JP | 2012-210117 A | 10/2012 |
| WO | WO 2012/086411 A1 | 6/2012 |

OTHER PUBLICATIONS

Written Opinion of the International Searching Authority issued for PCT/JP2014/067325, dated Aug. 12, 2014.

\* cited by examiner

WIRELESS POWER TRANSMISSION SYSTEM

CROSS REFERENCE TO RELATED APPLICATIONS

The present application is a continuation of PCT/JP2014/067325 filed Jun. 30, 2014, which claims priority to Japanese Patent Application No. 2013-137683, filed Jul. 1, 2013, the entire contents of each of which are incorporated herein by reference.

FIELD OF THE INVENTION

The present invention relates to a wireless power transmission system in which power is wirelessly transmitted from a power transmission device to a power reception device.

BACKGROUND OF THE INVENTION

As a representative example of a wireless power transmission system, a magnetic-field-coupling-method power transmission system is known in which power is transmitted by utilizing a magnetic field from a primary coil of a power transmission device to a secondary coil of a power reception device. In this system, when power is transmitted by magnetic field coupling, the magnitude of the magnetic flux passing through each coil greatly affects the electromotive force and therefore high accuracy is necessary in the relative positional relationship between the primary coil and the secondary coil. In addition, coils are utilized and therefore it difficult to reduce the size of the devices.

In contrast, an electric-field-coupling-method wireless power transmission system is also known as disclosed in Patent Documents 1 and 2. In such a system, power is transmitted via an electric field from a coupling electrode of a power transmission device to a coupling electrode of a power reception device. In this method, the degree of relative positional accuracy for the coupling electrodes is comparatively low and it is possible to reduce the size and the thickness of the coupling electrodes.

Patent Document 1: Japanese Unexamined Patent Application Publication (Translation of PCT Application) No. 2009-531009.

Patent Document 2: Japanese Unexamined Patent Application Publication No. 2009-296857.

An example of a power reception device in a wireless power transmission system is an electronic appliance such as a cellular phone device, a laptop PC or a tablet terminal. For example, the wireless power transmission system is used to wirelessly charge secondary batteries of these electronic appliances. When the power reception device is for example a tablet terminal in which the secondary battery has a large charging capacity, there is a problem that the charging time is long when power transmission is not efficiently performed.

SUMMARY OF THE INVENTION

Accordingly, an object of the present invention is to provide a wireless power transmission system in which power transmission can be efficiently performed.

A wireless power transmission system according to the present invention includes a power transmission device including a first power-transmission-side electrode and a second power-transmission-side electrode, and an alternating-current voltage applying circuit that applies an alternating-current voltage to the first power-transmission-side electrode and the second power-transmission-side electrode, and a power reception device including a first power-reception-side electrode that faces the first power-transmission-side electrode, a second power-reception-side electrode that faces the second power-transmission-side electrode, and a power-reception-side circuit that supplies to a load a voltage induced in the first power-reception-side electrode and the second power-reception-side electrode by capacitive coupling achieved as a result of the first power-reception-side electrode and the second power-reception-side electrode facing the first power-transmission-side electrode and the second power-transmission-side electrode. The power transmission device includes a power-transmission-side coil having a first end that is connected to the first power-transmission-side electrode and a second end that is connected to the second power-transmission-side electrode. The power reception device includes a power-reception-side coil having a first end that is connected to the first power-reception-side electrode and a second end that is connected to the second power-reception-side electrode. Magnetic flux generated by the power-reception-side coil links with the power-transmission-side coil and magnetic flux generated by the power-transmission-side coil links with the power-reception-side coil and as a result the power-transmission-side coil and the power-reception-side coil are magnetic-field coupled with each other.

With this configuration, by utilizing both electric-field coupling and magnetic-field coupling, the degree of coupling between the power transmission device and the power reception device can be increased and the efficiency with which power is transmitted from the power transmission device to the power reception device can be increased.

It is preferable that the first power-transmission-side electrode face the first power-reception-side electrode and the second power-transmission-side electrode face the second power-reception-side electrode, and that the power-transmission-side coil and the power-reception-side coil are provided so that coil winding axes thereof extend in the same direction and are wound such that a direction of a magnetic field generated by the power-transmission-side coil when a current flows from the second power-transmission-side electrode to the first power-transmission-side electrode via the power-transmission-side coil and a direction of a magnetic field generated by the power-reception-side coil when a current flows from the first power-reception-side electrode to the second power-reception-side electrode via the power-reception-side coil are the same.

With this configuration, the degree of coupling between the power transmission device and the power reception device can be further increased and the efficiency with which power is transmitted from the power transmission device to the power reception device can be further increased.

It is preferable that the power-transmission-side coil and the power-reception-side coil be planar coils and face each other with a gap therebetween.

With this configuration, by giving the power-transmission-side coil and the power-reception-side coil a planar shape, a reduction in the thicknesses of the power transmission device and the power reception device can be realized.

It is preferable that the first power-transmission-side electrode, the second power-transmission-side electrode and the power-transmission-side coil be provided along the same plane, and that the first power-reception-side electrode, the second power-reception-side electrode and the power-reception-side coil be provided along the same plane.

With this configuration, a reduction in the thicknesses of the power transmission device and the power reception device can be realized.

It is preferable that the second power-transmission-side electrode be connected to a reference potential of the power transmission device, the power-transmission-side coil be formed so as to surround the first power-transmission-side electrode, the second power-transmission-side electrode be formed so as to surround the power-transmission-side coil, the second power-reception-side electrode be connected to a reference potential of the power reception device, the power-reception-side coil be formed so as to surround the first power-reception-side electrode, and the second power-reception-side electrode be formed so as to surround the power-reception-side coil.

With this configuration, unwanted radiation from the first power-transmission-side electrode can be suppressed by the second power-transmission-side electrode in the power transmission device, and unwanted radiation from the first power-reception-side electrode can be suppressed by the second power-reception-side electrode in the power reception device.

It is preferable that the first power-transmission-side electrode and the second power-transmission-side electrode be arranged so as to face each other with the power-transmission-side coil interposed therebetween, and that the first power-reception-side electrode and the second power-reception-side electrode be arranged so as to face each other with the power-reception-side coil interposed therebetween.

With this configuration, the area occupied by the electrodes and coils in the power reception device and the power transmission device can be reduced.

It is preferable that the first power-transmission-side electrode and the second power-transmission-side electrode, and the first power-reception-side electrode and the second power-reception-side electrode have a shape that suppresses generation of eddy currents.

With this configuration, by suppressing the generation of eddy currents in the electrodes, canceling out of a magnetic field by an eddy current generated by an electrode can be prevented.

According to the present invention, by utilizing both electric-field coupling and magnetic-field coupling, the efficiency with which power is transmitted from a power transmission device to a power reception device can be increased.

DETAILED DESCRIPTION OF EXEMPLARY EMBODIMENTS

Figure 1:
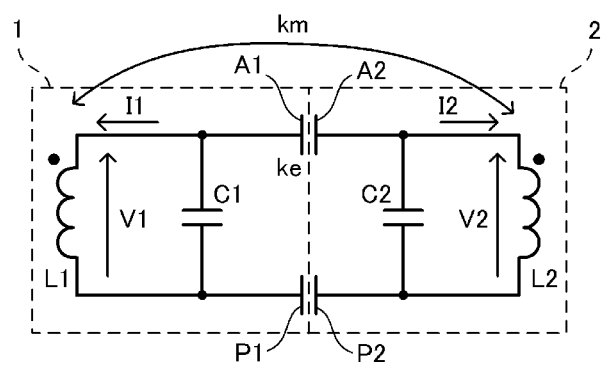
FIG. 1 is a circuit diagram illustrating coupling of two resonance circuits.

First, coupling of two resonance circuits will be explained. FIG. 1 is a circuit diagram illustrating coupling of two resonance circuits.

As illustrated in FIG. 1, active electrodes A1 and A2 and passive electrodes P1 and P2 of an LC resonance circuit 1, which includes a coil L1 and a capacitor C1, and an LC resonance circuit 2, which includes a coil L2 and a capacitor C2, face each other and are electric-field coupled with each other. The coupling coefficient of this electric field coupling is represented by ke. In addition, the coils L1 and L2 of the LC resonance circuits 1 and 2 are magnetic-field coupled with each other. The coupling coefficient of this magnetic field coupling is represented by km. The directions of voltages V1 and V2 and currents I1 and I2 are fixed in the directions illustrated in FIG. 1 and the orientations of the coupled coils are specified by the dots and thereby the relative signs of the coils are determined. The coupling coefficient km can take a value of −1<km<1 (currents and voltages for the case of a positive km are illustrated in FIG.

1). For simplicity, the coils L1 and L2 and the capacitors C1 and C2 of the LC resonance circuits 1 and 2 have the same values.

Here, when k represents the coupling coefficient in the case where the two LC resonance circuits 1 and 2 are coupled with each other with both electric field coupling and magnetic field coupling, ke represents the coupling coefficient in the case where only electric field coupling is used and km represents the coupling coefficient in the case where only magnetic field coupling is used, the relation k=(ke−km)/(1−ke·km) exists. The following Equation (1) and Equation (2) must both be satisfied in order to make the coupling coefficient achieved by using both an electric field and a magnetic field be higher than the coupling coefficient achieved with just electric field coupling and the coupling coefficient achieved with just magnetic field coupling.

$$|k|>ke(0<ke<1) \quad (1)$$

$$|k|>|km|(-1<km<1(km\neq 0)) \quad (2)$$

Here, since the coupling coefficients k and km may take negative values, the equations are written using the absolute values of the coefficients. The case where the numerator of the coupling coefficient k is greater than zero and the case where the numerator is smaller than zero are separately handled, and conditions that satisfy both Equation (1) and Equation (2) are determined.

When ke−km>0, conditions that satisfy Equation (1) are km<0 and 0<ke<1. Conditions that satisfy Equation (2) are km<0 and 0<ke<1, or km>0 and ke>2 km/(1+km$^2$). Therefore, conditions that satisfy both Equation (1) and Equation (2) are km<0 and 0<ke<1.

When ke−km=0, there is no solution that satisfies Equation (1) and Equation (2).

When ke−km<0, conditions that satisfy Equation (1) are km>2ke/(1+ke$^2$). However, there are no conditions that satisfy Equation (2). Therefore, there are no conditions that satisfy both Equation (1) and Equation (2).

Therefore, in the case of the coupling resonance system illustrated in FIG. 1, when the coil coupling structure is set to have −1<km<0, the degree of coupling when the two resonance circuits are coupled with each other using both electric field coupling and magnetic field coupling is higher than in the case where just electric field coupling is used and in the case where just magnetic field coupling is used.

Figure 2:
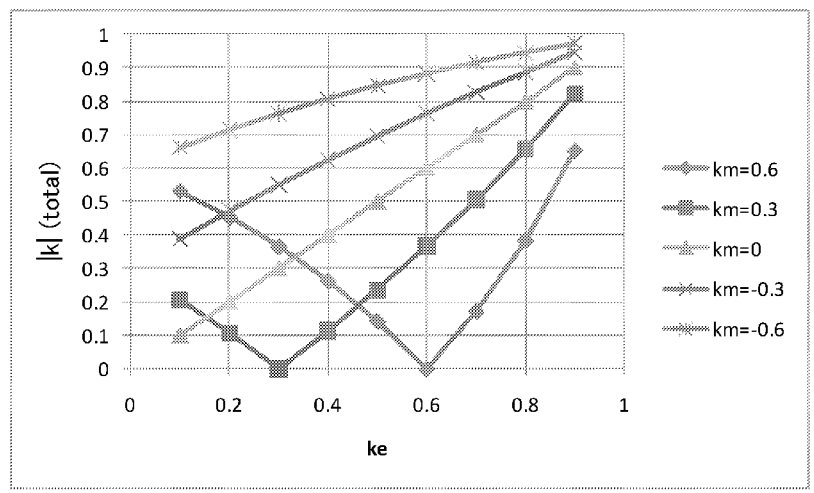
FIG. 2 illustrates the relationship between coupling coefficients.

FIG. 2 illustrates the relationship between the coupling coefficients. As illustrated in FIG. 2, the coupling coefficient k increases more due to magnetic field coupling than due to the coupling coefficient ke of electric field coupling under conditions of −1<km<0.

Figure 3:
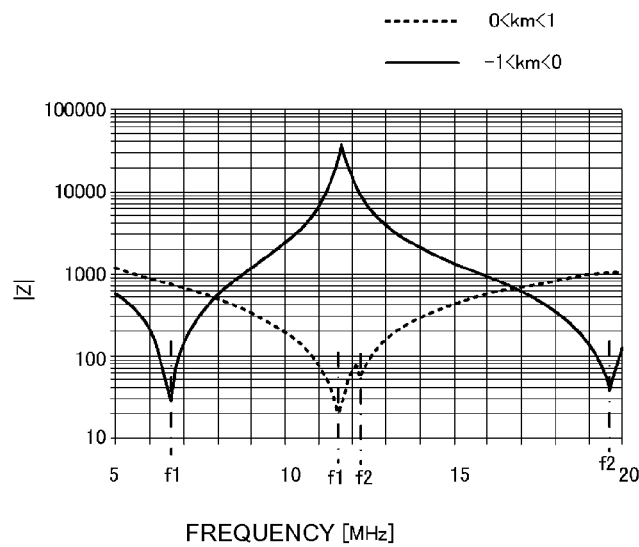
FIG. 3 illustrates measurement results of frequency characteristics of an input impedance of a coupling unit.

FIG. 3 illustrates measurement results of frequency characteristics of an input impedance of the coupling unit in the circuit of FIG. 1. FIG. 3 illustrates measurement results of frequency characteristics for the case of 0<km<1 and the case of −1<km<0. The resonant frequency f1 and the resonant frequency f2 illustrated in FIG. 3 are coupling resonant frequencies generated when the power-transmission-side resonance circuit and the power-reception-side resonance circuit couple with each other.

As is clear from FIG. 3, the resonant frequency f1 is 11.56 MHz and the resonant frequency f2 is 12.22 MHz in the case of 0<km<1. In addition, the resonant frequency f1 is 6.62 MHz and the resonant frequency f2 is 19.54 MHz in the case of −1<km<0. Here, expressing the coupling coefficient k using the resonant frequencies f1 and f2, the coupling coefficient can be expressed as k=(f2$^2$−f1$^2$)/(f2$^2$+f1$^2$). The coupling coefficient k is 0.06 in the case of 0<km<1 and 0.79 in the case of −1<km<0. In addition, although not illustrated in FIG. 3, the resonant frequencies f1 and f2 in the case where only magnetic field coupling is used are 11.56 and 19.44 and the coupling coefficient km is 0.48. Furthermore, the resonant frequencies f1 and f2 in the case where only electric field coupling is used are 8.8 and 14.22 and the coupling coefficient ke is 0.45.

That is, the coupling coefficient k is higher in the case where −1<km<0. A power transmission system can be formed by connecting a power supply and a load to two resonance systems. In a power transmission system formed by coupling of two resonance systems, the power transmission efficiency increases as the coupling coefficient between the resonance circuits increases. Therefore, the power transmission efficiency of a power transmission system formed using these resonance systems is higher. Here, a negative km has been used to explain the phenomenon using the same equivalent circuit, but in the following embodiments, description will be given using a positive magnetic field coupling coefficient km.

(Embodiment 1)

Figure 4:
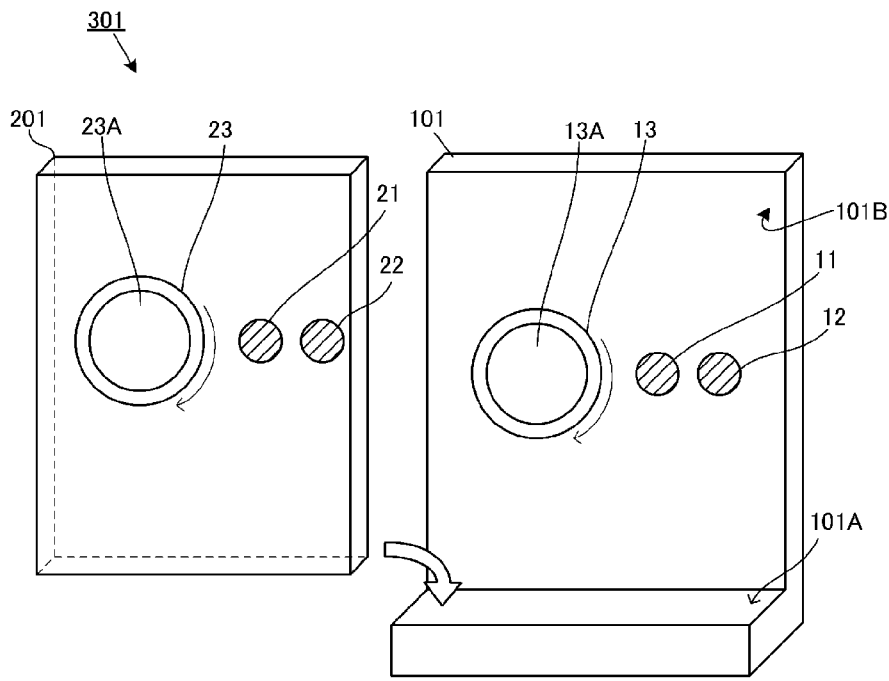
FIG. 4 is a perspective view illustrating a power transmission device and a power reception device of a wireless power transmission system according to a first embodiment.

FIG. 4 is a perspective view illustrating a power transmission device and a power reception device of a wireless power transmission system 301 according to Embodiment 1. Active electrodes 11 and 21, passive electrodes 12 and 22 and planar coils 13 and 23 are provided inside casings of a power transmission device 101 and a power reception device 201 and these casings are illustrated in a see-through manner in FIG. 4.

The power reception device 201 of the wireless power transmission system 301 is a mobile electronic appliance equipped with a battery module including a secondary battery, a charging circuit and so forth. Examples of such a mobile electronic appliance include cellular phones, portable music players, laptop PCs, digital cameras and so forth. The power reception device 201 is mounted on the power transmission device 101 and the power transmission device 101 charges the secondary battery of the power reception device 201.

The power transmission device 101 has a mounting surface 101A that is substantially parallel to its installation surface and a backrest surface 101B that is substantially orthogonal to the mounting surface 101A. The power reception device 201 is mounted on the mounting surface 101A and the backrest surface 101B prevents the mounted power reception device 201 from falling over. The circular active electrode 11 and passive electrode 12 and the annular planar coil 13 are provided along the backrest surface 101B inside the power transmission device 101.

The active electrode 11 corresponds to a first power-transmission-side electrode or a second power-transmission-side electrode of the present invention and the passive electrode 12 corresponds to the second power-transmission-side electrode or the first power-transmission-side electrode of the present invention. In addition, the planar coil 13 corresponds to a power-transmission-side coil of the present invention.

The power reception device 201 includes a substantially rectangular-parallelepiped-shaped casing and for example a liquid crystal panel, which is not illustrated, is provided at a front surface of the casing. The power reception device 201 is mounted on the mounting surface 101A such that its back surface is in surface contact with the backrest surface 101B of the power transmission device 101. The circular active electrode 21 and passive electrode 22 and the annular planar coil 23 are provided along the back surface inside the power reception device 201.

The active electrode 21 corresponds to a first power-reception-side electrode or a second power-reception-side electrode of the present invention and the passive electrode 22 corresponds to the second power-reception-side electrode or the first power-reception-side electrode of the present invention. In addition, the planar coil 23 corresponds to a power-reception-side coil of the present invention.

The active electrodes 11 and 21 have the same diameter as each other and the passive electrodes 12 and 22 also have the same diameter as each other. Furthermore, the planar coils 13 and 23 have the same outer diameter as each other and have coil openings 13A and 23A of the same diameter.

Figure 5:
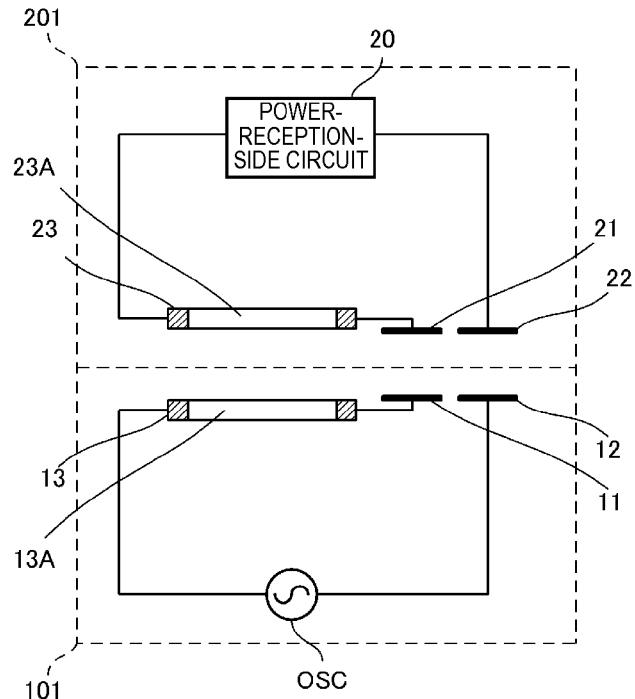
FIG. 5 is a sectional view illustrating the positional relationship between active electrodes, passive electrodes and planar coils when the power reception device is mounted on the power transmission device.

FIG. 5 is a sectional view illustrating the positional relationship between the active electrodes 11 and 21, the passive electrodes 12 and 22 and the planar coils 13 and 23 when the power reception device 201 is mounted on the power transmission device 101. As illustrated in FIG. 5, the active electrodes 11 and 21, the passive electrodes 12 and 22 and the planar coils 13 and 23 respectively face each other with their central axes aligned and a gap therebetween when the power reception device 201 is mounted on the power transmission device 101. In the case illustrated in FIG. 5, a magnetic field is generated in a direction orthogonal to a plane of the coil openings 13A and 23A when a current flows through the planar coils 13 and 23.

A high-frequency voltage of for example 100 kHz to several tens of MHz generated by a high-frequency oscillation circuit OSC is applied to the active electrode 11 and the passive electrode 12 in the power transmission device 101. As a result, the active electrodes 11 and 21 capacitively couple with each other and the passive electrodes 12 and 22 also capacitively couple with each other. In the power reception device 201, a voltage is induced in the active electrode 21 and the passive electrode 22 by the capacitive coupling and this voltage is stepped down, rectified and smoothed by a power-reception-side circuit 20.

In addition, in the power transmission device 101, when a voltage is applied to the active electrode 11 and the passive electrode 12, a current flows through the planar coil 13 and a magnetic field is generated by the planar coil 13. This magnetic field links with the planar coil 23 and as a result a current flows through the planar coil 23. In addition, a current flows through the planar coil 23 due to a voltage being induced in the active electrode 21 and the passive electrode 22 and as a result a magnetic field is also generated by the planar coil 23. That is, the magnetic field linked with the planar coil 23 is strengthened. Since the magnetic fields are generated in the same direction by the planar coils 13 and 23, the planar coils 13 and 23 are magnetic-field coupled with each other.

Thus, in the wireless power transmission system 301 according to this embodiment, power is transmitted from the power transmission device 101 to the power reception device 201 using a combination of capacitive coupling and magnetic-field coupling when the power reception device 201 is mounted on the power transmission device 101.

Figure 6A:
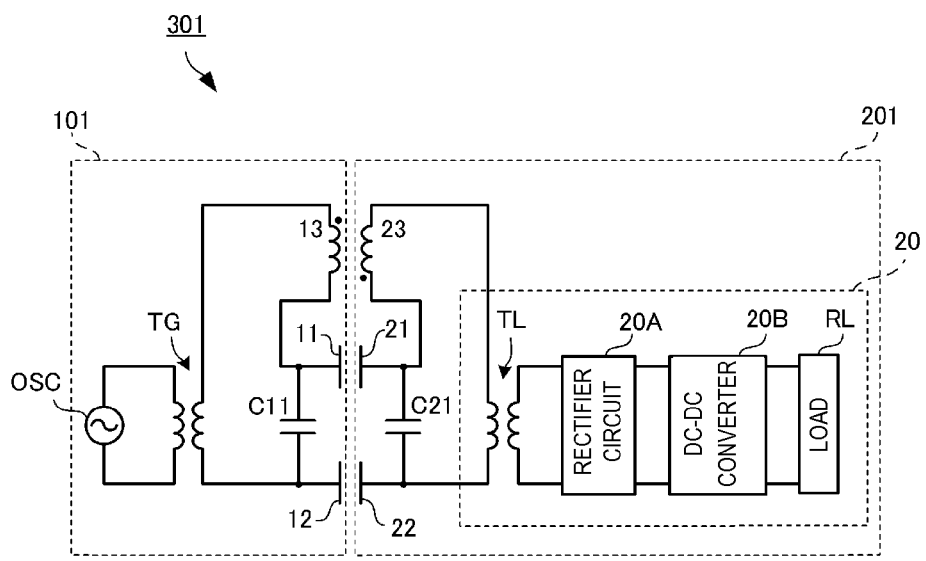
FIG. 6A illustrates a circuit of the wireless power transmission system.

FIG. 6A illustrates a circuit of the wireless power transmission system 301.

The power transmission device 101 includes the high-frequency oscillation circuit OSC and a step-up transformer TG. The step-up transformer TG steps up a voltage generated by the high-frequency oscillation circuit OSC and applies the stepped up voltage between the active electrode 11 and the passive electrode 12. A capacitor C11 is a stray capacitance formed between the active electrode 11 and the passive electrode 12 or is an actual component. The planar coil 13 forms a series resonance circuit with the capacitor C11.

The power reception device 201 includes a step-down transformer TL that steps down a voltage induced in the active electrode 21 and the passive electrode 22, a rectifier circuit 20A that converts a stepped-down alternating-current voltage into a direct-current voltage and a DC-DC converter 20B that outputs a prescribed direct-current voltage to a load RL. A capacitor C21 is a stray capacitance formed between the active electrode 21 and the passive electrode 22 or is an actual component. The planar coil 23 forms a series resonance circuit with the capacitor C21.

In the wireless power transmission system 301, the power reception device 201 is mounted on the power transmission device 101 and a voltage is applied between the active electrode 11 and the passive electrode 12 of the power transmission device 101, and as a result the active electrodes 11 and 21 and the passive electrodes 12 and 22, which are arranged so as to face each other, capacitively couple with each other through the electric fields generated therebetween. Then, power is transmitted from the power transmission device 101 to the power reception device 201 via the electric fields. In the power reception device 201, an alternating-current voltage induced by the power transmission is stepped down, rectified and smoothed, and is then applied to the load RL.

As described above, the wireless power transmission system 301 is a power transmission system that employs both electric-field coupling and magnetic-field coupling and the power transmission efficiency thereof is high. In addition, since the planar coils 13 and 23 are provided such that the coil winding axes thereof have the same orientation and are wound such that the direction of a magnetic field generated by the planar coil 13 when a current flows from the passive electrode 12 to the active electrode 11 via the planar coil 13 and the direction of a magnetic field generated by the planar coil 23 when a current flows from the active electrode 21 to the passive electrode 22 via the planar coil 23 are the same, the coupling coefficient k can be increased. As a result, efficient power transmission can be realized.

The circuit of the wireless power transmission system 301 is not limited to the configuration illustrated in FIG. 6A. FIGS. 6B to 6F illustrate other examples of a circuit of the wireless power transmission system 301.

Figure 6B:
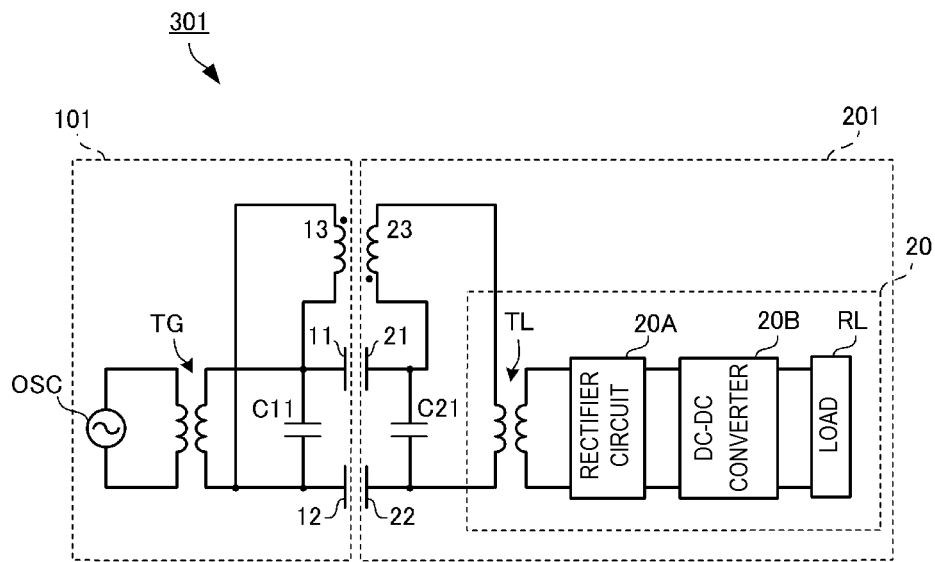
FIG. 6B illustrates another example of a circuit of the wireless power transmission system.

In FIG. 6B, one end of the planar coil 13 of the power transmission device 101 is connected to the active electrode 11 and the other end of the planar coil 13 is connected to the passive electrode 12. The planar coil 13 forms a parallel resonance circuit with the capacitor C11. In addition, similarly to as in FIG. 6A, the planar coil 23 of the power reception device 201 forms a series resonance circuit with the capacitor C21.

Figure 6C:
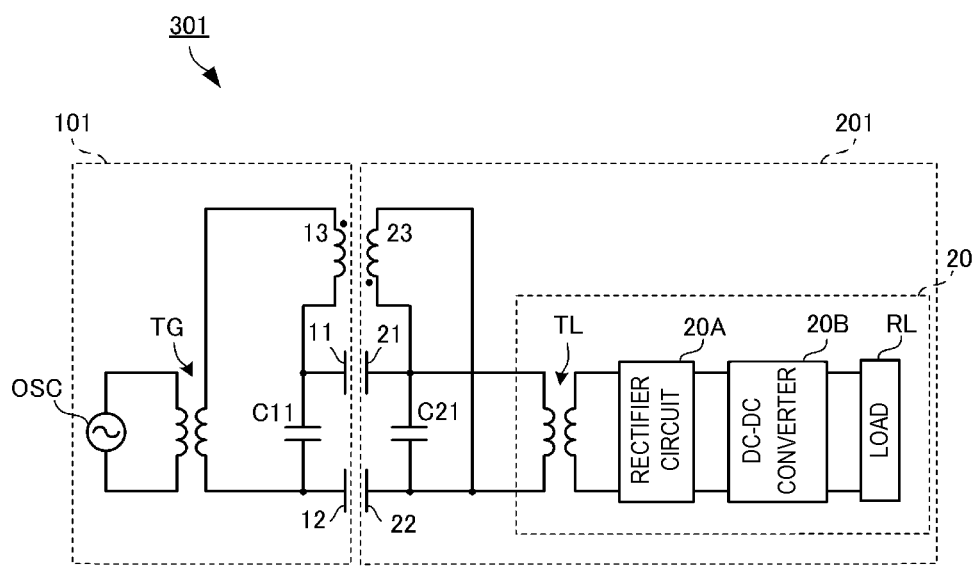
FIG. 6C illustrates another example of a circuit of the wireless power transmission system.

In FIG. 6C, similarly to as in FIG. 6A, the planar coil 13 of the power transmission device 101 forms a parallel resonance circuit with the capacitor C11. In addition, one end of the planar coil 23 of the power reception device 201 is connected to the active electrode 21 and the other end of the planar coil 23 is connected to the passive electrode 22. The planar coil 23 forms a parallel resonance circuit with the capacitor C21.

Figure 6D:
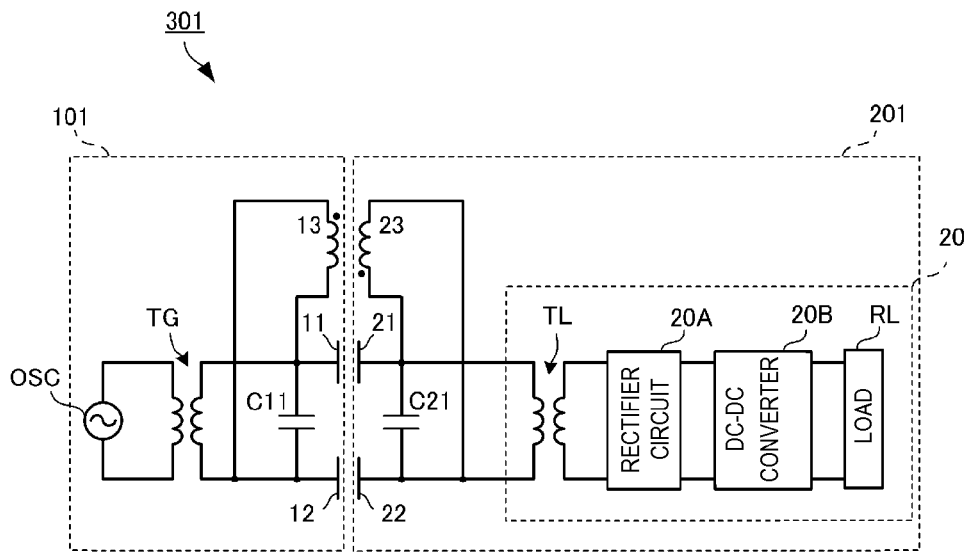
FIG. 6D illustrates another example of a circuit of the wireless power transmission system.

In FIG. 6D, similarly to as in FIG. 6B, the planar coil 13 of the power transmission device 101 forms a parallel resonance circuit with the capacitor C11. In addition, similarly to as in FIG. 6C, the planar coil 23 of the power reception device 201 forms a parallel resonance circuit with the capacitor C21.

Figure 6E:
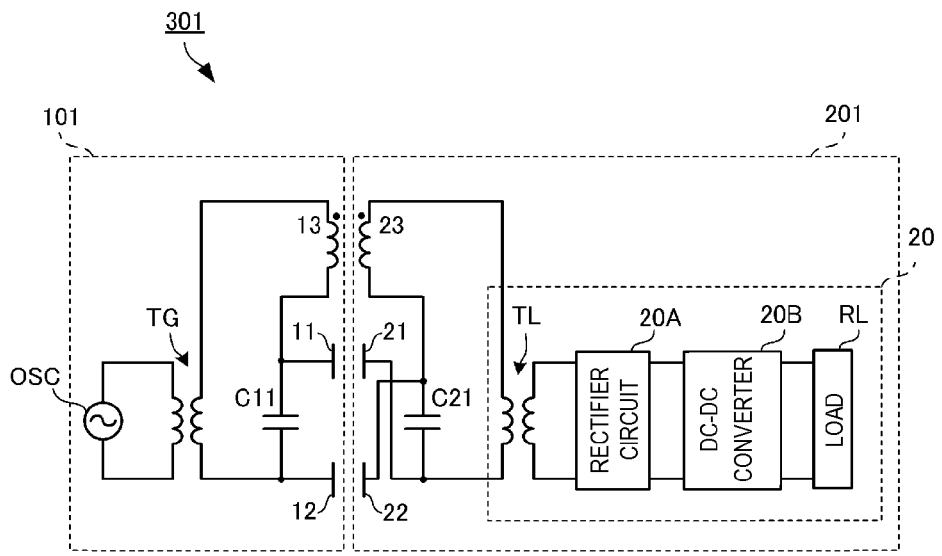
FIG. 6E illustrates another example of a circuit of the wireless power transmission system.

FIG. 6E illustrates a configuration in which the active electrode 11 of the power transmission device 101 and the active electrode 21 of the power reception device 201 face and couple with each other and in which the passive electrode 12 of the power transmission device 101 and the passive electrode 22 of the power reception device 201 face and couple with each other. However, the connection positions of the active electrode 21 and the passive electrode 22 of the power reception device 201 are reversed compared with FIG. 6A. In this case, the planar coil 13 of the power transmission device 101 is connected in the same way as in FIG. 6A. The planar coil 23 of the power reception device 201 is connected with the opposite orientation to in FIG. 6A, that is, such that the polarity of the planar coil 23 when a current flows is the opposite of that in FIG. 6A.

Figure 6F:
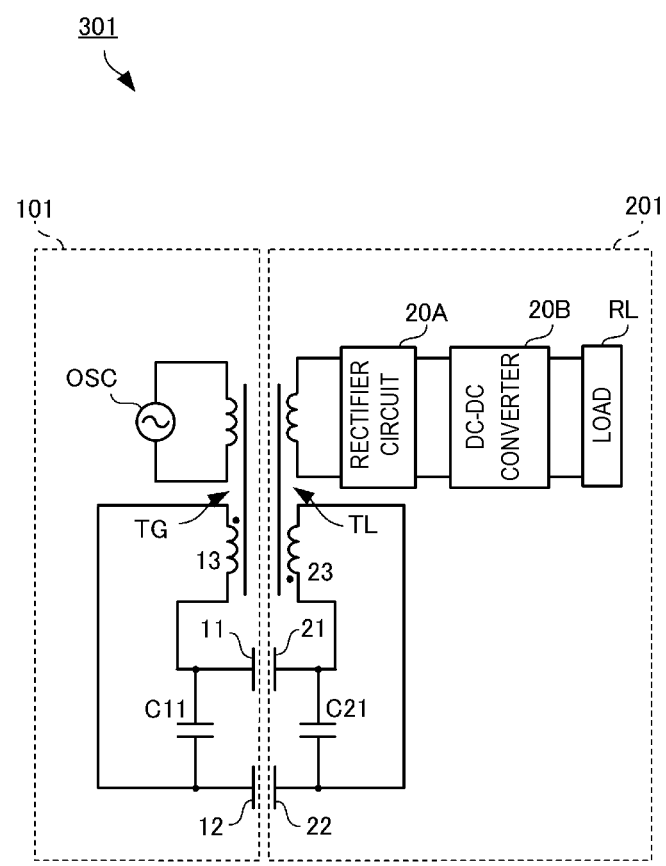
FIG. 6F illustrates another example of a circuit of the wireless power transmission system.

In the power transmission device 101 in FIG. 6F, a secondary coil of the step-up transformer TG is employed as the planar coil 13 of the power transmission device 101. In addition, in the power reception device 201, a primary coil of the step-down transformer TL is employed as the planar coil 23.

(Embodiment 2)

Hereafter, Embodiment 2 of the present invention will be described. In this embodiment, the shapes of the active electrodes and the passive electrodes of the power transmission device and power reception device are different to those in Embodiment 1. This difference will be described hereafter.

Figure 7:
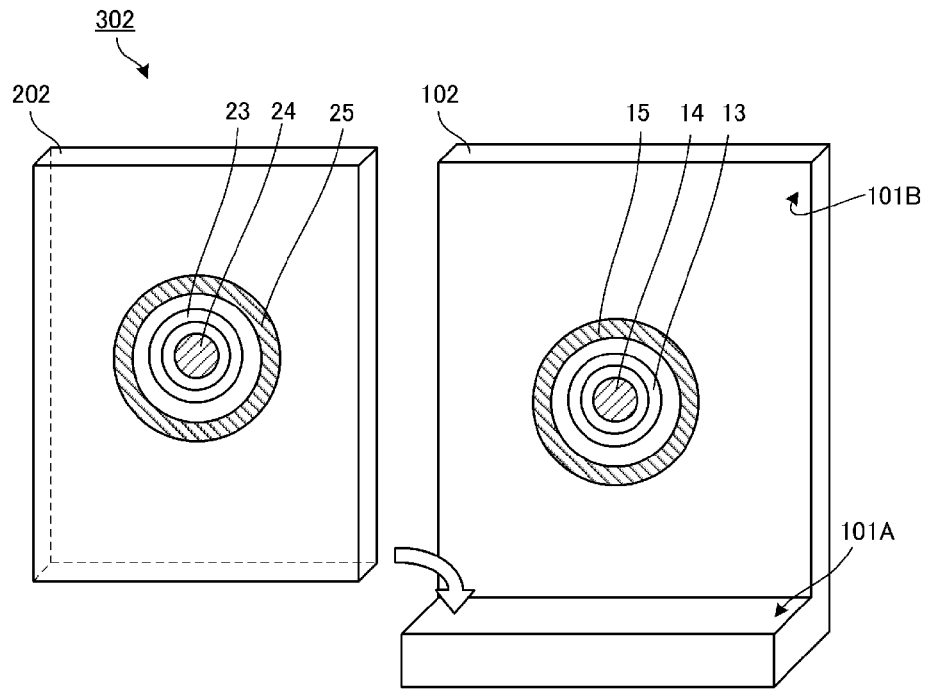
FIG. 7 is a perspective view illustrating a power transmission device and a power reception device of a wireless power transmission system according to second embodiment.
Figure 8:
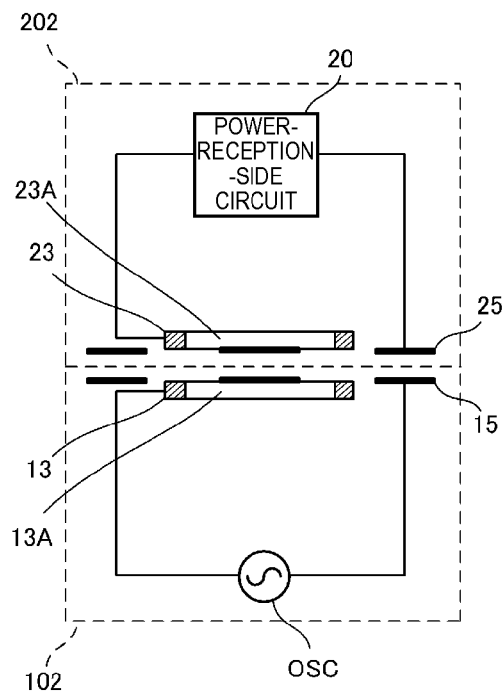
FIG. 8 is a sectional view illustrating the positional relationship between active electrodes, passive electrodes and planar coils when the power reception device is mounted on the power transmission device.

FIG. 7 is a perspective view illustrating a power transmission device 102 and a power reception device 202 of a wireless power transmission system 302 according to Embodiment 2. FIG. 8 is a sectional view illustrating the positional relationship between active electrodes 14 and 24, passive electrodes 15 and 25 and planar coils 13 and 23 when the power reception device 202 is mounted on the power transmission device 102.

The power transmission device 102 includes the planar coil 13, the circular active electrode 14 and the annular passive electrode 15 provided along a backrest surface 101B. The planar coil 13, the active electrode 14 and the passive electrode 15 are provided such that the central axes thereof are aligned with each other. In addition, the active electrode 14 is arranged inside the planar coil 13 and the planar coil 13 and the active electrode 14 are arranged inside the passive electrode 15. Since the passive electrode 15 surrounds the planar coil 13 and the active electrode 14, unwanted radiation emitted from the planar coil 13 and the active electrode 14 can be suppressed.

The power reception device 202 includes the planar coil 23, the circular active electrode 24 and the annular passive electrode 25 provided along the back surface of the casing. The planar coil 23, the active electrode 24 and the passive electrode 25 are provided such that the central axes thereof are aligned with each other. In addition, the active electrode 24 is arranged inside the planar coil 23 and the planar coil 23 and the active electrode 24 are arranged inside the passive electrode 25. Since the passive electrode 25 surrounds the planar coil 23 and the active electrode 24, unwanted radiation emitted from the planar coil 23 and the active electrode 24 can be suppressed. The active electrodes 14 and 24 have the same diameters as each other and the passive electrodes 15 and 25 have the same diameters as each other.

When the power reception device 202 is mounted on the power transmission device 102, the active electrodes 14 and 24 and the passive electrodes 15 and 25 respectively face each other with a gap therebetween. In addition, a coil opening 13A of the planar coil 13 is aligned with a coil opening 23A of the planar coil 23 and the planar coil 13 faces the planar coil 23 with a gap therebetween.

In the wireless power transmission system 302 according to Embodiment 2, the degree of coupling when the power transmission device 102 and the power reception device 202 are allowed to couple with each other is increased by using both electric-field coupling and magnetic-field coupling as in Embodiment 1. Thus, high power transmission efficiency from the power transmission device 102 to the power reception device 202 is realized.

It is preferable that the active electrodes 14 and 24 and the passive electrodes 15 and 25 of this embodiment be electrodes having a comb-teeth-like shape for example. Since the active electrodes 14 and 24 are arranged in the coil openings of the planar coils 13 and 23, eddy currents would be generated that would disturb the magnetic fields generated by the planar coils 13 and 23 if the active electrodes 14 and 24 were plate electrodes. Accordingly, by making the active electrodes 14 and 24 have a comb-teeth-like shape, generation of eddy currents can be suppressed and canceling out of the magnetic fields generated by the planar coils 13 and 23 can be prevented. It is preferable that the passive electrodes 15 and 25 also have a comb-teeth-like shape from the viewpoint of suppressing eddy current loss.

(Embodiment 3)

Hereafter, Embodiment 3 of the present invention will be described. In this embodiment, the configurations of the magnetic-field-coupled coils and the active electrodes and passive electrodes of the power transmission device and power reception device are different to those in Embodiment 1. This difference will be described hereafter.

Figure 9:
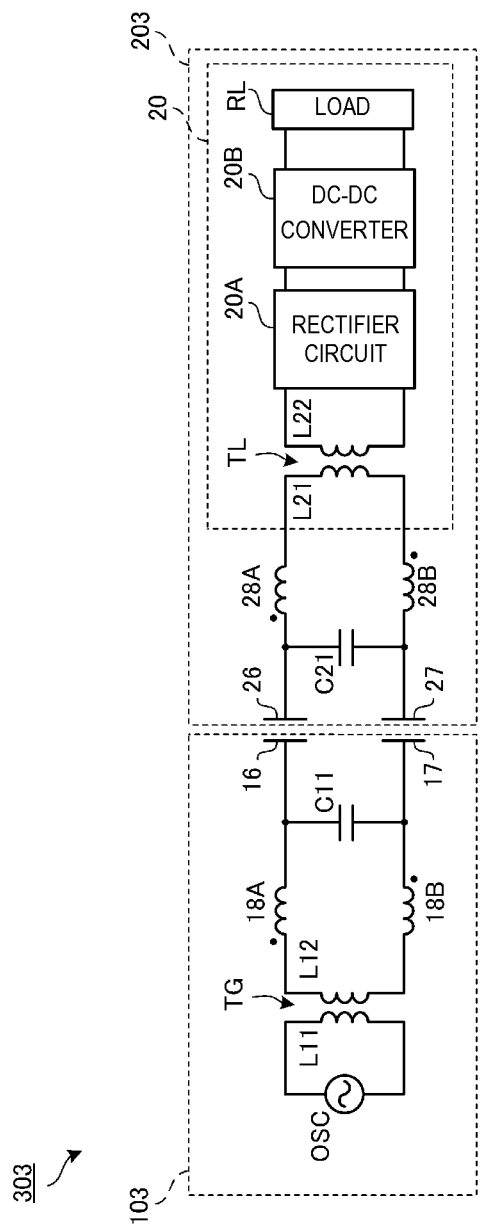
FIG. 9 is a circuit diagram of a wireless power transmission system according to third embodiment.

FIG. 9 is a circuit diagram of a wireless power transmission system 303 according to Embodiment 3.

In this embodiment, a first coil 18A and a second coil 18B are connected to an active electrode 16 and a passive electrode 17 in a power transmission device 103. The first coil 18A and the second coil 18B form an LC resonance circuit with a capacitor C11 and so forth. The first coil 18A and the second coil 18B are connected to a secondary coil L12 of a step-up transformer TG and the first coil 18A, the second coil 18B and the secondary coil L12 form a single coil (hereafter, referred to as power-transmission-side coil). The active electrode 16 and the passive electrode 17 are formed by this power-transmission-side coil. That is, active electrode 16, the passive electrode 17, the first coil 18A, the second coil 18B and the secondary coil L12 are formed by the single power-transmission-side coil.

Figure 10A:
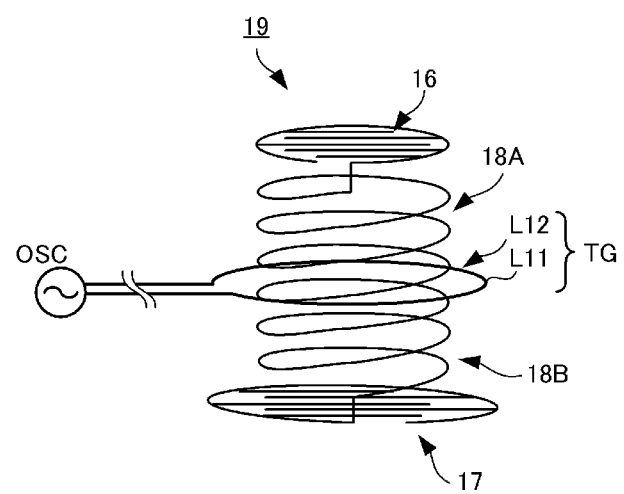
FIG. 10A is a diagram illustrating the configuration of a power-transmission-side coil.

FIG. 10A is a diagram illustrating the configuration of the power-transmission-side coil. A power-transmission-side coil 19 is formed of the first coil 18A, the second coil 18B and the secondary coil L12 of the step-up transformer TG as described above. A primary coil L11 of the step-up transformer TG is provided around the periphery of the secondary coil L12 in the power-transmission-side coil 19 and the primary coil L11 and the secondary coil L12 are magnetic-field coupled with each other.

In addition, the active electrode 16 and the passive electrode 17 are formed by forming electrodes in comb-teeth-like shapes in coil openings at the two ends of the power-transmission-side coil 19. The two ends of the power-transmission-side coil 19 where the active electrode 16 and the passive electrode 17 are formed are formed such that the passive electrode 17 is larger than the active electrode 16 when viewed in plan. By making the active electrode 16 and the passive electrode 17 be comb-teeth-shaped plate electrodes, generation of eddy currents can be suppressed and canceling out of the magnetic field generated by the power-transmission-side coil 19 can be prevented.

The configuration of the coil openings at the two ends of the power-transmission-side coil 19 is not limited to the configuration illustrated in FIG. 10A and it is sufficient that the coil openings have a shape capable of suppressing generation of eddy currents. FIGS. 10B to 10F illustrate other examples of the configuration of the power-transmission-side coil. FIGS. 10B to 10F are plan views of modifications of the active electrode 16. FIGS. 10B to 10F illustrate only the configuration of the active electrode 16, but the passive electrode 17 may have the same configuration as any of these modifications of the active electrode 16.

Figure 10B:
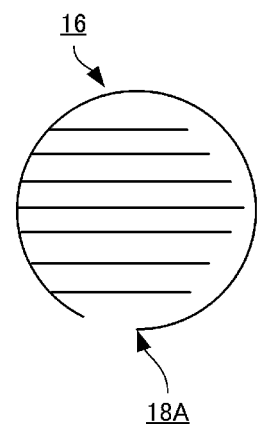
FIG. 10B illustrates another example of the configuration of the power-transmission-side coil.
Figure 10C:
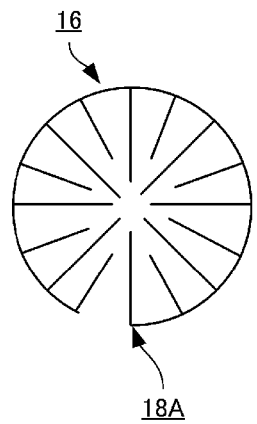
FIG. 10C illustrates another example of the configuration of the power-transmission-side coil.
Figure 10D:
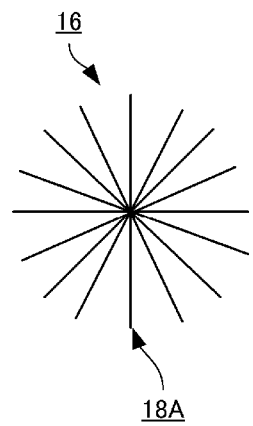
FIG. 10D illustrates another example of the configuration of the power-transmission-side coil.
Figure 10E:
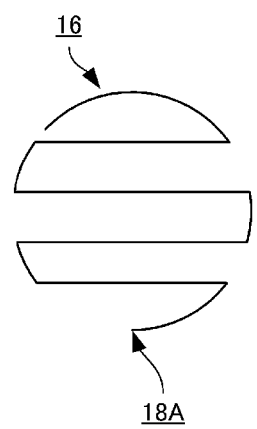
FIG. 10E illustrates another example of the configuration of the power-transmission-side coil.
Figure 10F:
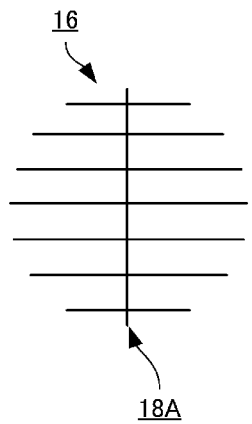
FIG. 10F illustrates another example of the configuration of the power-transmission-side coil.

As illustrated in FIG. 10B, the active electrode 16 may be formed in a comb-teeth-like shape. In addition, as illustrated in FIG. 10C, the active electrode 16 may be formed in a radial shape extending from a circular outer periphery toward the inside. Furthermore, as illustrated in FIG. 10D, the active electrode 16 may be formed in a radial shape extending from the inside toward the outside. As illustrated in FIG. 10E, the active electrode 16 may be formed in a meandering shape. As illustrated in FIG. 10F, the active electrode 16 may be formed in a shape like the veins of a leaf.

A shape that suppresses generation of eddy currents is not a shape in which the conductors of the active electrode 16 and the passive electrode 17 have a broad plate-like shape overall when viewed in plan along the winding axis of the power-transmission-side coil 19, but rather is a shape in which line-shaped conductors of the active electrode 16 and the passive electrode 17 bend back and forth or join together and in which a closed loop is not formed by the line-shaped conductors.

Returning to FIG. 9, a first coil 28A and a second coil 28B are connected to an active electrode 26 and a passive electrode 27 in a power reception device 203. The first coil 28A and the second coil 28B form an LC resonance circuit with a capacitor C21 and so forth. The first coil 28A and the second coil 28B are connected to a primary coil L21 of a step-down transformer TL and the first coil 28A, the second coil 28B and the primary coil L21 form a single coil (hereafter, referred to as power-reception-side coil). The active electrode 26 and the passive electrode 27 are formed by this power-reception-side coil. Since the configuration of the power-reception-side coil is the same as that of the power-transmission-side coil 19 illustrated in FIG. 8, description thereof is omitted.

Figure 11:
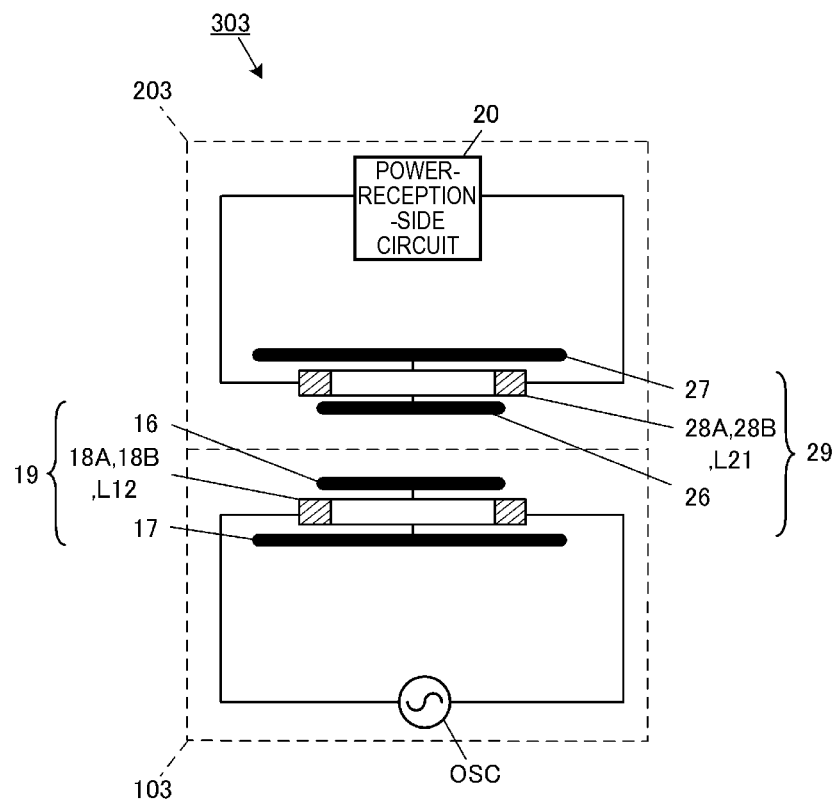
FIG. 11 is a sectional view illustrating the positional relationship between a power-transmission-side coil and a power-reception-side coil when the power reception device is mounted on the power transmission device.

FIG. 11 is a sectional view illustrating the positional relationship between the power-transmission-side coil and the power-reception-side coil when the power reception device 203 is mounted on the power transmission device 103.

The power-transmission-side coil 19 and a power-reception-side coil 29 are provided such that their winding axes substantially align when the power reception device 203 is mounted on the power transmission device 103. In addition, the power-transmission-side coil 19 is provided such that the active electrode 16 is on the power reception device 203 side and the power-reception-side coil 29 is provided such that the active electrode 26 is on the power transmission device 103 side. That is, the active electrodes 16 and 26 face each other with a gap therebetween and the passive electrodes 17 and 27 face each other with the active electrodes 16 and 26 interposed therebetween. In addition, the power-transmission-side coil 19 and the power-reception-side coil 29 are configured such that magnetic fields generated thereby when currents flow therethrough have the same directions.

In the power transmission device 103, a voltage generated by the high-frequency oscillation circuit OSC is applied to the power-transmission-side coil 19 via the primary coil L11 of the step-up transformer illustrated in FIGS. 9 and 10. Then, the active electrodes 16 and 26 capacitively couple with each other and the passive electrodes 17 and 27 also capacitively couple with each other, and as a result power is transmitted from the power transmission device 103 to the power reception device 203. In addition, magnetic fields generated by the first coil 18A, the second coil 18B and the secondary coil L12, and the first coil 28A, the second coil 28B and the primary coil L21 are generated in the same direction and the power-transmission-side coil 19 and the power-reception-side coil 29 are magnetic-field coupled with each other. The degree of coupling of this magnetic-field coupling is high as described in Embodiments 1 and 2. Therefore, efficient power transmission can be realized between the power transmission device 103 and the power reception device 203.

In the wireless power transmission system 303 according to this embodiment, the power transmission device 103 includes the first coil 18A and the second coil 18B and the power reception device 203 includes the first coil 28A and the second coil 28B but the wireless power transmission system 303 is not limited to this configuration. For example, a configuration may be adopted in which the power transmission device 103 includes only the first coil 18A and the first coil 18A magnetic-field couples with the first coil 28A and the second coil 28B of the power reception device 203. In addition, a configuration may be adopted in which the power transmission device 103 includes only the first coil 18A and the power reception device 203 includes only the second coil 28B and the first coil 18A and the second coil 28B magnetic-field couple with each other.

(Embodiment 4)

Figure 12:
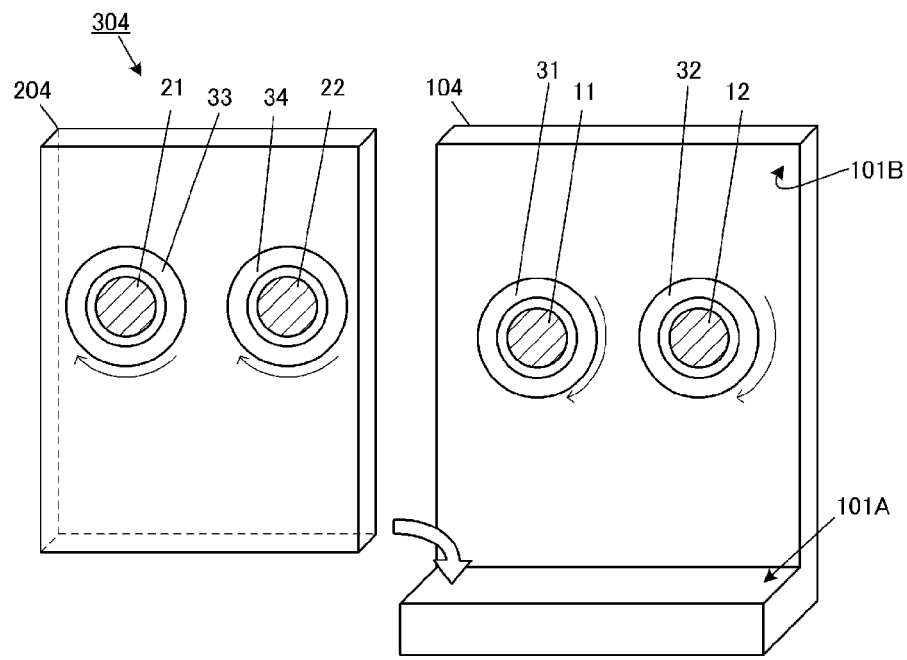
FIG. 12 is a perspective view illustrating a power transmission device and a power reception device of a wireless power transmission system according to a fourth embodiment.
Figure 13:
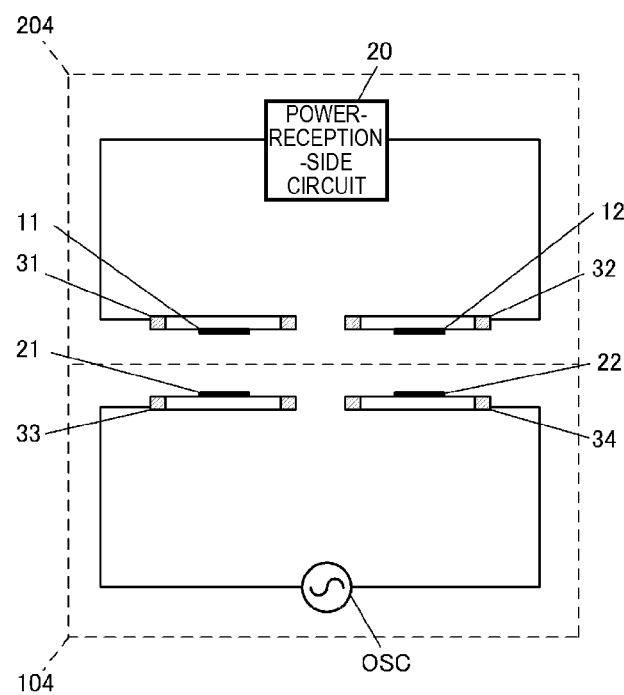
FIG. 13 is a sectional view illustrating the positional relationship between active electrodes, passive electrodes and planar coils when the power reception device is mounted on the power transmission device.
Figure 14:
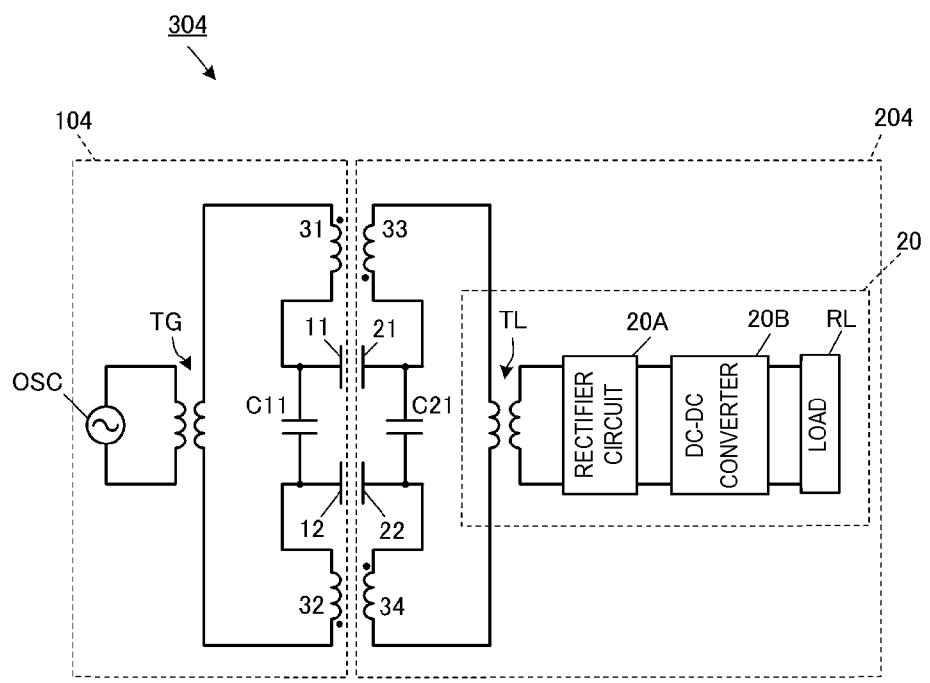
FIG. 14 is a circuit diagram of a wireless power transmission system.

FIG. 12 is a perspective view illustrating a power transmission device 104 and a power reception device 204 of a wireless power transmission system 304 according to Embodiment 4. FIG. 13 is a sectional view illustrating the positional relationship between active electrodes 11 and 21, passive electrodes 12 and 22 and planar coils 31, 32, 33 and 34 when the power reception device 204 is mounted on the power transmission device 104. FIG. 14 is a circuit diagram of the wireless power transmission system 304.

The power transmission device 104 includes the circular active electrode 11 and passive electrode 12 and the annular planar coils 31 and 32 provided along a backrest surface 101B. The active electrode 11 and the planar coil 31 are provided such that their central axes are aligned and such that the active electrode 11 is located inside the planar coil 31. In addition, the passive electrode 12 and the planar coil 32 are provided such that their central axes are aligned and such that the passive electrode 12 is located inside the planar coil 32.

The power reception device 204 includes the circular active electrode 21 and passive electrode 22 and the annular planar coils 33 and 34 provided along a back surface of the casing. The planar coils 33 and 34 have the same diameters as the planar coils 31 and 32, respectively. The active electrode 21 and the planar coil 33 are provided such that their central axes are aligned and such that the active electrode 21 is located inside the planar coil 33. In addition, the passive electrode 22 and the planar coil 34 are provided such that their central axes are aligned and such that the passive electrode 22 is located inside the planar coil 34.

When the power reception device 204 is mounted on the power transmission device 104, the active electrode 11 and the planar coil 31 face the active electrode 21 and the planar coil 33 with a gap therebetween and the passive electrode 12 and the planar coil 32 face the passive electrode 22 and the planar coil 34 with a gap therebetween. At this time, the directions of magnetic fields generated by the planar coils 31 and 33, which face each other, are the same and the directions of magnetic fields generated by the planar coils 32 and 34, which face each other, are the same.

It is preferable that the active electrodes 11 and 21 and the passive electrodes 12 and 22 be comb-teeth-shaped in order to suppress generation of eddy currents as described in Embodiments 2 and 3.

In the wireless power transmission system 304 according to Embodiment 4, the degree of coupling when the power transmission device 104 and the power reception device 204 are allowed to couple with each other is increased by using both electric-field coupling and magnetic-field coupling as in Embodiment 1. Thus, high power transmission efficiency from the power transmission device 104 to the power reception device 204 is realized. In addition, the symmetry of the circuit configuration of the power transmission section can be made high and a low noise system can be formed.

In this embodiment, a configuration is adopted in which the planar coils 31 and 33, which surround the active electrodes 11 and 21, are magnetic-field coupled with each other and the planar coils 32 and 34, which surround the passive electrodes 12 and 22, are magnetic-field coupled with each other, but a configuration may be adopted in which the planar coils 31 and 34 are magnetic-field coupled with each other and the planar coils 32 and 33 are magnetic-field coupled with each other.

REFERENCE SIGNS LIST 11, 14, 16—active electrode (first power-transmission-side electrode, second power-transmission-side electrode)
12, 15, 17—passive electrode (second power-transmission-side electrode, first power-transmission-side electrode)
13—planar coil (power-transmission-side coil, planar coil)
18A—first coil
18B—second coil
19—power-transmission-side coil
20—power-reception-side circuit
21, 24, 26—active electrode (first power-reception-side electrode, second power-reception-side electrode)
22, 25, 27—passive electrode (second power-reception-side electrode, first power-reception-side electrode)
23—planar coil (power-reception-side coil)
28A—first coil
28B—second coil
29—power-reception-side coil
101, 102, 103, 104—power transmission device
201, 202, 203, 204—power reception device
301, 302, 303, 304—wireless power transmission system
OSC—high-frequency oscillation circuit (alternating-current voltage applying circuit)

The invention claimed is:

1. A wireless power transmission system comprising:
   a power transmission device including:
      a first power-transmission-side electrode,
      a second power-transmission-side electrode,
      an oscillation circuit configured to apply an alternating-current voltage to the first and second power-transmission-side electrodes, and
      a power-transmission-side coil having a first end connected to the first power-transmission-side electrode and a second end connected to the second power-transmission-side electrode; and
   a power reception device including:
      a first power-reception-side electrode positioned to face the first power-transmission-side electrode,
      a second power-reception-side electrode positioned to face the second power-transmission-side electrode,
      a power-reception-side circuit configured to supply to a load a voltage induced in the first and second power-reception-side electrodes by capacitive coupling when the first and second power-reception-side electrodes face the first and second power-transmission-side electrodes, respectively, and
      a power-reception-side coil having a first end connected to the first power-reception-side electrode and a second end connected to the second power-reception-side electrode,
   wherein the power-transmission-side coil is magnetic-field coupled to the power-reception-side coil.

2. The wireless power transmission system according to claim 1, wherein magnetic flux generated by the power-reception-side coil linked with the power-transmission-side coil and magnetic flux generated by the power-transmission-side coil linked with the power-reception-side coil causes the power-transmission-side coil and the power-reception-side coil to be magnetic-field coupled with each other.

3. The wireless power transmission system according to claim 1, wherein coil winding axes of the power-transmission-side coil and the power-reception-side coil extend in the same direction.

4. The wireless power transmission system according to claim 3, wherein each of the coil winding axes are wound such that a direction of a magnetic field generated by the power-transmission-side coil when a current flows from the second power-transmission-side electrode to the first power-transmission-side electrode via the power-transmission-side coil is in a same direction as a magnetic field generated by the power-reception-side coil when a current flows from the first power-reception-side electrode to the second power-reception-side electrode via the power-reception-side coil.

5. The wireless power transmission system according to claim 1, wherein the power-transmission-side coil and the power-reception-side coil are planar coils configured to face each other with a gap therebetween.

6. The wireless power transmission system according to claim 1,
   wherein the first power-transmission-side electrode, the second power-transmission-side electrode and the power-transmission-side coil are disposed along a same plane of the power transmission device, and
   wherein the first power-reception-side electrode, the second power-reception-side electrode and the power-reception-side coil are disposed along a same plane of the power reception device.

7. The wireless power transmission system according to claim 1,
   wherein the power-transmission-side coil surrounds the first power-transmission-side electrode and the second power-transmission-side electrode surrounds the power-transmission -side coil, and
   wherein the power-reception-side coil surrounds the first power-reception-side electrode and the second power-reception-side electrode surrounds the power-reception-side coil.

8. The wireless power transmission system according to claim 7, wherein the first power-transmission-side electrode and the first power-reception-side electrode each comprise a circular shape, and the second power-transmission-side electrode and the second power-reception-side electrode each comprise an annular shape.

9. The wireless power transmission system according to claim 1,
wherein the first and second power-transmission-side electrodes are disposed in the power transmission device so as to face each other with the power-transmission-side coil interposed therebetween, and
wherein the first and second power-reception-side electrodes are disposed in the power reception device so as to face each other with the power-reception-side coil interposed therebetween.

10. The wireless power transmission system according to claim 9, wherein the first and second power-transmission-side electrodes and the first and second power-reception-side electrodes have a shape configured to suppress generation of eddy currents.

11. The wireless power transmission system according to claim 1, wherein the power-transmission-side coil forms a parallel resonance circuit with a capacitance between the first power-transmission-side electrode and the second power-transmission-side electrode.

12. The wireless power transmission system according to claim 10, wherein the power-reception-side coil forms a parallel resonance circuit with a capacitance between the first power-reception-side electrode and the second power-reception-side electrode.

13. A wireless power transmission system comprising:
a power transmission device including:
a first power-transmission-side electrode,
a second power-transmission-side electrode,
an oscillation circuit configured to apply an alternating-current voltage to the first and second power-transmission-side electrodes,
a first power-transmission-side coil coupled between the oscillation circuit and the first power-transmission-side electrode,
a second power-transmission-side coil coupled between the oscillation circuit and the second power-transmission-side electrode; and
a power reception device including:
a first power-reception-side electrode positioned to face the first power-transmission-side electrode,
a second power-reception-side electrode positioned to face the second power-transmission-side electrode,
a power-reception-side circuit configured to supply to a load a voltage induced in the first and second power-reception-side electrodes by capacitive coupling when the first and second power-reception-side electrodes face the first and second power-transmission-side electrodes, respectively,
a first power-reception-side coil coupled between the first power-reception-side electrode and the load,
a second power-reception-side coil coupled between the second power-reception-side electrode and the load,
wherein the first and second power-transmission-side coils are magnetic-field coupled to the first and second power-reception-side coils.

14. The wireless power transmission system according to claim 13, wherein magnetic flux generated by the first and second power-reception-side coils linked with the first and second power-transmission-side coils and magnetic flux generated by the first and second power-transmission-side coils linked with the power-reception-side coils causes the respective coils to be magnetic-field coupled with each other.

15. The wireless power transmission system according to claim 13, wherein the first and second power-transmission-side electrodes and the first and second power-reception-side electrodes have a shape configured to suppress generation of eddy currents.

16. A power transmission device for wirelessly transmitting power to a power reception device including first and second power-reception-side electrodes and a power-reception-side coil coupled to the first and second power-reception-side electrodes, the power transmission device comprising:
a first power-transmission-side electrode configured to face the first power-reception-side electrode and to be capacitively coupled with the first power-reception-side electrode to induce a voltage therebetween when the power reception device is mounted on the power transmission device;
a second power-transmission-side electrode configured to face the second power-reception-side electrode and to be capacitively coupled with the second power-reception-side electrode to induce a voltage therebetween when the power reception device is mounted on the power transmission device;
an oscillation circuit configured to apply an alternating-current voltage to the first and second power-transmission-side electrodes; and
a power-transmission-side coil having a first end connected to the first power-transmission-side electrode and a second end connected to the second power-transmission-side electrode,
wherein the power-transmission-side coil is magnetic-field coupled to the power-reception-side coil of the power reception device when the power reception device is mounted on the power transmission device.

17. The power transmission device according to claim 16, wherein magnetic flux generated by the power-reception-side coil linked with the power-transmission-side coil and magnetic flux generated by the power-transmission-side coil linked with the power-reception-side coil causes the power-transmission-side coil and the power-reception-side coil to be magnetic-field coupled with each other.

18. The power transmission device system according to claim 16,
wherein coil winding axes of the power-transmission-side coil and the power-reception-side coil extend in the same direction, and
wherein each of the coil winding axes are wound such that a direction of a magnetic field generated by the power-transmission-side coil when a current flows from the second power-transmission-side electrode to the first power-transmission-side electrode via the power-transmission-side coil is in a same direction as a magnetic field generated by the power-reception-side coil when a current flows from the first power-reception-side electrode to the second power-reception-side electrode via the power-reception-side coil.

19. The wireless power transmission system according to claim 16, wherein the first power-transmission-side electrode, the second power-transmission-side electrode and the power-transmission-side coil are disposed along a same plane of the power transmission device.

20. The power transmission device according to claim 16, wherein the power-transmission-side coil surrounds the first power-transmission-side electrode and the second power-transmission-side electrode surrounds the power-transmission-side coil.

\* \* \* \* \*